US012706086B2

(12) United States Patent
Li et al.

(10) Patent No.: US 12,706,086 B2
(45) Date of Patent: Aug. 11, 2026

(54) PARAMETER-EFFICIENT MODEL REPROGRAMMING FOR CROSS-LINGUAL SPEECH RECOGNITION

(71) Applicant: Google LLC, Mountain View, CA (US)

(72) Inventors: Bo Li, Santa Clara, CA (US); Yu Zhang, Mountain View, CA (US); Nanxin Chen, Mountain View, CA (US); Rohit Prakash Prabhavalkar, Palo Alto, CA (US); Chao-Han Huck Yang, Mountain View, CA (US); Tara N. Sainath, Jersey City, NJ (US); Trevor Strohman, Mountain View, CA (US)

(73) Assignee: Google LLC, Mountain View, CA (US)

(*) Notice: Subject to any disclaimer, the term of this patent is extended or adjusted under 35 U.S.C. 154(b) by 378 days.

(21) Appl. No.: 18/490,808

(22) Filed: Oct. 20, 2023

(65) Prior Publication Data

US 2024/0185841 A1 Jun. 6, 2024

Related U.S. Application Data

(60) Provisional application No. 63/380,788, filed on Oct. 25, 2022.

(51) Int. Cl.
*G10L 15/065* (2013.01)
*G10L 15/00* (2013.01)

(52) U.S. Cl.
CPC .......... *G10L 15/065* (2013.01); *G10L 15/005* (2013.01)

(58) Field of Classification Search
CPC ...... G10L 15/065; G10L 15/005; G10L 15/16
USPC .......................................................... 704/232
See application file for complete search history.

(56) References Cited

U.S. PATENT DOCUMENTS

| | | | | |
|---|---|---|---|---|
| 6,026,359 | A * | 2/2000 | Yamaguchi | G10L 15/065 704/E15.009 |
| 6,839,670 | B1 * | 1/2005 | Stammler | G10L 15/26 704/270 |
| 7,225,125 | B2 * | 5/2007 | Bennett | G10L 15/30 704/E15.047 |
| 7,277,854 | B2 * | 10/2007 | Bennett | G10L 15/18 707/999.005 |
| 8,983,844 | B1 * | 3/2015 | Thomas | G10L 15/20 704/226 |
| 9,984,682 | B1 * | 5/2018 | Tao | G10L 15/183 |

(Continued)

OTHER PUBLICATIONS

International Search Report and Written Opinion issued in related PCT Application No. PCT/US2023/035569, dated Feb. 7, 2024.

(Continued)

*Primary Examiner* — Thuykhanh Le
(74) *Attorney, Agent, or Firm* — Honigman LLP; Brett A. Krueger; Grant Griffith

(57) ABSTRACT

A method includes obtaining an ASR model trained to recognize speech in a first language and receiving transcribed training utterances in a second language. The method also includes integrating the ASR model with an input reprogramming module and a latent reprogramming module. The method also includes adapting the ASR model to learn how to recognize speech in the second language by training the input reprogramming module and the latent reprogramming module while parameters of the ASR model are frozen.

22 Claims, 7 Drawing Sheets

(56) References Cited

U.S. PATENT DOCUMENTS 10,204,620 B2* 2/2019 Cui ..................... G10L 17/18
10,204,621 B2* 2/2019 Cui ..................... G10L 15/075
10,614,827 B1* 4/2020 Korjani ............... G10L 21/0364
11,348,591 B1* 5/2022 Moinuddin ............ G10L 25/24
12,002,451 B1* 6/2024 Liu ..................... G10L 15/16
12,100,385 B2* 9/2024 Hung ................... G06F 40/58
2002/0173959 A1* 11/2002 Gong ................... G10L 15/20 704/E15.039
2007/0271088 A1* 11/2007 Waibel ................ G06F 40/263 704/9
2008/0114593 A1* 5/2008 Tashev ................ G10L 15/065 704/226
2008/0114598 A1* 5/2008 Prieto ................. G10L 15/005 704/254
2009/0187402 A1* 7/2009 Scholl ................. G10L 15/01 704/E15.039
2010/0204988 A1* 8/2010 Xu ...................... G10L 15/065 704/256.2
2010/0291528 A1* 11/2010 Huerta ................. G09B 7/00 434/362
2010/0318354 A1* 12/2010 Seltzer ................ G10L 15/063 704/E15.032
2011/0015925 A1* 1/2011 Xu ...................... G10L 15/20 704/256.2
2011/0238416 A1* 9/2011 Seltzer ................ G10L 15/20 704/E15.039
2012/0253799 A1* 10/2012 Bangalore ............ G10L 15/183 704/E15.001
2013/0103402 A1* 4/2013 Chopra ................ G10L 15/08 704/E15.005
2014/0142925 A1* 5/2014 Gish .................... G10L 15/063 704/10
2014/0257805 A1* 9/2014 Huang ................. G10L 15/063 704/232
2014/0278395 A1* 9/2014 Zurek .................. G10L 15/20 704/231
2015/0127339 A1* 5/2015 Tjalve ................. G10L 15/187 704/235
2015/0134320 A1* 5/2015 Rangarajan Sridhar .................... G10L 15/005 704/2
2016/0005399 A1* 1/2016 Audhkhasi ............ G10L 15/144 704/240
2017/0148433 A1* 5/2017 Catanzaro ............ G10L 15/16
2017/0206892 A1* 7/2017 Doddipatla ........... G10L 15/065
2018/0005628 A1* 1/2018 Xue ..................... G10L 15/063
2018/0018959 A1* 1/2018 Des Jardins .......... G10L 15/005
2019/0115010 A1* 4/2019 Yu ....................... G10L 13/04
2019/0122101 A1* 4/2019 Lei ...................... G06F 17/16
2019/0348023 A1* 11/2019 Kwon .................. G10L 15/22
2020/0160836 A1* 5/2020 Chen ................... G10L 15/005
2020/0349923 A1* 11/2020 Hu ...................... G10L 15/193
2020/0380215 A1* 12/2020 Kannan ................ G06F 40/40
2021/0043190 A1* 2/2021 Wang .................. G10L 15/20
2022/0101842 A1* 3/2022 Srinivasan ............ G06Q 10/06
2022/0122581 A1* 4/2022 Chen ................... G10L 13/047
2022/0122585 A1* 4/2022 Thomas ................ G10L 15/16
2022/0351718 A1* 11/2022 Wu ...................... G10L 15/16
2022/0383877 A1* 12/2022 Nam .................... G10L 15/26
2023/0072352 A1* 3/2023 Geng ................... G10L 15/16
2023/0082944 A1* 3/2023 Ren ..................... G10L 15/02 704/254
2023/0169954 A1* 6/2023 Thomas ................ G10L 15/16 704/200
2023/0290345 A1* 9/2023 Joshi ................... G06N 3/044
2023/0352009 A1* 11/2023 Behre .................. G10L 15/19
2023/0360642 A1* 11/2023 Lai ...................... G06N 3/0895
2024/0078391 A1* 3/2024 Kim ..................... G06F 40/40
2024/0079024 A1* 3/2024 Jia ....................... G10L 21/003
2024/0105162 A1* 3/2024 Wang .................. G10L 15/22
2024/0265924 A1* 8/2024 Li ........................ G10L 15/005

OTHER PUBLICATIONS

Abdelrahman Mohamed et al, “Self-Supervised Speech Representation Learning: A Review”, arxiv.org, Cornell University Library, 201 Olin Library Cornell University Ithaca, NY 14853, Jun. 15, 2022 (Jun. 15, 2022), XP091246862.

Waters Austin et al, “Leveraging Language ID in Multilingual End-to-End Speech Recognition”, Dec. 1, 2019 (Dec. 1, 2019), p. 928-935, Retrieved from the Internet: URL:https://ieeexplore.ieee.org/stampPDF/getPDF.jsp?tp=&arnumber=9003870&ref=aHR0cHM6Ly9pZWVleHBsb3JILmllZWUub3JnL2RvY3VtZW50LzkwMDM4NzA=XP05586674

Aldarmaki Hanan et al, “Unsupervised Automatic Speech Recognition: A review”, Mar. 9, 2022 (Mar. 9, 2022), vol. {0} 139, p. 76-91, XP087012668

* cited by examiner

PARAMETER-EFFICIENT MODEL REPROGRAMMING FOR CROSS-LINGUAL SPEECH RECOGNITION

CROSS REFERENCE TO RELATED APPLICATIONS

This U.S. Patent Application claims priority under 35 U.S.C. § 119(e) to U.S. Provisional Application 63/380,788, filed on Oct. 25, 2022. The disclosure of this prior application is considered part of the disclosure of this application and is hereby incorporated by reference in its entirety.

TECHNICAL FIELD

This disclosure relates to parameter-efficient model reprogramming for cross-lingual speech recognition.

BACKGROUND

Automatic speech recognition (ASR) is the process of transcribing input speech data into text. Recently, performance of large-scale ASR models has made tremendous advances in terms of both accuracy (e.g., word error rate (WER)) and latency (e.g., delay from a speaker speaking until text is output). Yet, these advances are generally limited to recognizing speech from high-resource languages that have a substantial amount of training data, such as English, while other low-resource languages have not seen similar performance advances. Tuning these large-scale ASR models for a new task (e.g., recognizing speech from a different low-resource language) adds a significant amount of complexity to the model and requires additional training. Thus, in some examples, large-scale ASR models are either not tuned to recognize speech from low-resource languages because of the additional training. In other examples, large-scale ASR models that are tuned to recognize speech from the low-resource languages are too large to deploy on mobile devices.

SUMMARY

One aspect of the disclosure provides a computer-implemented method that when executed on data processing hardware causes the data processing hardware to perform operations for parameter-efficient model reprogramming for cross-lingual speech recognition. The operations include obtaining an automatic speech recognition model (ASR) model trained on an initial training dataset to recognize speech in a first language. The operations also include receiving an adaptation training dataset that includes one or more transcribed training utterances in a second language different than the first language. Each respective transcribed training utterance in the adaptation training dataset is paired with a corresponding transcription. The operations also include integrating the ASR model with an input reprogramming module and a latent reprogramming module and adapting the ASR model integrated with the input reprogramming module and the latent reprogramming module to learn how to recognize speech in the second language by training the input reprogramming module and the latent reprogramming module on the adaptation training dataset while parameters of the ASR model are frozen.

Implementations of the disclosure may include one or more of the following optional features. In some implementations, training the input reprogramming module and the latent reprogramming module on the adaptation training dataset while parameters of the ASR model are frozen includes, for each respective transcribed training utterance, training the input reprogramming module and the latent reprogramming module includes augmenting the respective transcribed training utterance with a first trainable noise using the input reprogramming module, augmenting a projection output corresponding to the respective augmented transcribed training utterance with a second trainable noise using the latent reprogramming module, generating a corresponding speech recognition result for the respective transcribed training utterance based on the augmented projection output using the ASR model integrated with the input reprogramming module and the latent reprogramming module, determining a supervised loss based on the corresponding speech recognition result for the respective transcribed training utterance and the corresponding transcription, and training the input reprogramming module and the latent reprogramming module based on the supervised loss.

In some implementations, the adaptation training dataset further includes additional transcribed training utterances in a plurality of other languages each different than the first language. Augmenting the respective transcribed training utterance with the first trainable noise may include extracting acoustic feature-dependent noise from the respective transcribed training utterance, generating acoustic feature-independent noise, and determining the first trainable noise based on the acoustic feature-dependent noise and the acoustic feature-independent noise. In some examples, augmenting the respective transcribed training utterance with the first trainable noise minimizes a distance between a distribution of the initial training dataset and a distribution of the adaptation training dataset. Augmenting the projection output with the second trainable noise may include extracting latent feature-dependent noise from the projection output, generating latent feature-independent noise, and determining the second trainable noise using the latent feature-dependent noise and the latent feature-independent noise.

In some implementations, the ASR model includes an encoder having one or more encoder blocks each including a respective encoder layer and the latent reprogramming module comprises a stack of reprogramming layers each including a corresponding bridged connection with a respective subsequent reprogramming layer in the stack of reprogramming layers. In these implementations, integrating the ASR model with the input reprogramming module and the latent reprogramming module includes inserting the stack of reprogramming layers into the encoder such that each respective reprogramming layer in the stack of reprogramming layers disposed between each encoder block of the one or more encoder blocks.

In some examples, the ASR model integrated with the input reprogramming module and the latent reprogramming module includes: an encoder that has an input layer configured to receive the respective augmented transcribed training utterance from the input reprogramming module and generate a corresponding projection output and one or more encoder blocks configured to receive the corresponding projection output generated by the input layer and generate a corresponding higher order feature representation; a prediction network configured to receive a sequence of non-blank symbols output by a final Softmax layer and generate a dense representation; and a joint network configured to receive the higher order feature representation generated by the encoder and the dense representation generated by the prediction network and generate the corresponding speech recognition result for the respective augmented transcribed training utterance using a set of pre-trained multilingual graphemes. The adaptation training dataset may further include one or more untranscribed training utterances in the second language each not paired with any corresponding transcription. Here, the operations may further include determining an unsupervised loss using the one or more untranscribed training utterances and training the input reprogramming module and the latent reprogramming module jointly on the unsupervised loss and the supervised loss.

Another aspect of the disclosure provides a system that includes data processing hardware and memory hardware storing instructions that when executed on the data processing hardware causes the data processing hardware to perform operations. The operations include obtaining an automatic speech recognition model (ASR) model trained on an initial training dataset to recognize speech in a first language. The operations also include receiving an adaptation training dataset that includes one or more transcribed training utterances in a second language different than the first language. Each respective transcribed training utterance in the adaptation training dataset is paired with a corresponding transcription. The operations also include integrating the ASR model with an input reprogramming module and a latent reprogramming module and adapting the ASR model integrated with the input reprogramming module and the latent reprogramming module to learn how to recognize speech in the second language by training the input reprogramming module and the latent reprogramming module on the adaptation training dataset while parameters of the ASR model are frozen.

Implementations of the disclosure may include one or more of the following optional features. In some implementations, training the input reprogramming module and the latent reprogramming module on the adaptation training dataset while parameters of the ASR model are frozen includes, for each respective transcribed training utterance, training the input reprogramming module and the latent reprogramming module includes augmenting the respective transcribed training utterance with a first trainable noise using the input reprogramming module, augmenting a projection output corresponding to the respective augmented transcribed training utterance with a second trainable noise using the latent reprogramming module, generating a corresponding speech recognition result for the respective transcribed training utterance based on the augmented projection output using the ASR model integrated with the input reprogramming module and the latent reprogramming module, determining a supervised loss based on the corresponding speech recognition result for the respective transcribed training utterance and the corresponding transcription, and training the input reprogramming module and the latent reprogramming module based on the supervised loss.

In some implementations, the adaptation training dataset further includes additional transcribed training utterances in a plurality of other languages each different than the first language. Augmenting the respective transcribed training utterance with the first trainable noise may include extracting acoustic feature-dependent noise from the respective transcribed training utterance, generating acoustic feature-independent noise, and determining the first trainable noise based on the acoustic feature-dependent noise and the acoustic feature-independent noise. In some examples, augmenting the respective transcribed training utterance with the first trainable noise minimizes a distance between a distribution of the initial training dataset and a distribution of the adaptation training dataset. Augmenting the projection output with the second trainable noise may include extracting latent feature-dependent noise from the projection output, generating latent feature-independent noise, and determining the second trainable noise using the latent feature-dependent noise and the latent feature-independent noise.

In some implementations, the ASR model includes an encoder having one or more encoder blocks each including a respective encoder layer and the latent reprogramming module comprises a stack of reprogramming layers each including a corresponding bridged connection with a respective subsequent reprogramming layer in the stack of reprogramming layers. In these implementations, integrating the ASR model with the input reprogramming module and the latent reprogramming module includes inserting the stack of reprogramming layers into the encoder such that each respective reprogramming layer in the stack of reprogramming layers disposed between each encoder block of the one or more encoder blocks.

In some examples, the ASR model integrated with the input reprogramming module and the latent reprogramming module includes: an encoder that has an input layer configured to receive the respective augmented transcribed training utterance from the input reprogramming module and generate a corresponding projection output and one or more encoder blocks configured to receive the corresponding projection output generated by the input layer and generate a corresponding higher order feature representation; a prediction network configured to receive a sequence of non-blank symbols output by a final Softmax layer and generate a dense representation; and a joint network configured to receive the higher order feature representation generated by the encoder and the dense representation generated by the prediction network and generate the corresponding speech recognition result for the respective augmented transcribed training utterance using a set of pre-trained multilingual graphemes. The adaptation training dataset may further include one or more untranscribed training utterances in the second language each not paired with any corresponding transcription. Here, the operations may further include determining an unsupervised loss using the one or more untranscribed training utterances and training the input reprogramming module and the latent reprogramming module jointly on the unsupervised loss and the supervised loss.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
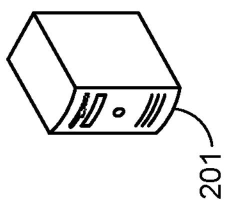
FIG. 1 is a schematic view of an example speech recognition system.
Figure 1:
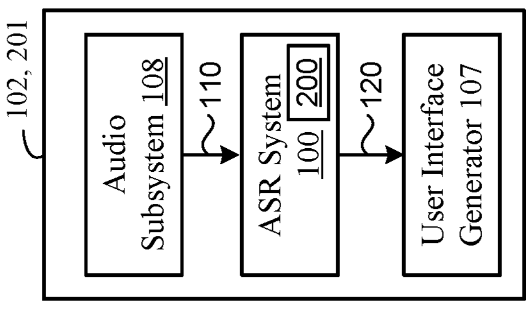
Figure 1:
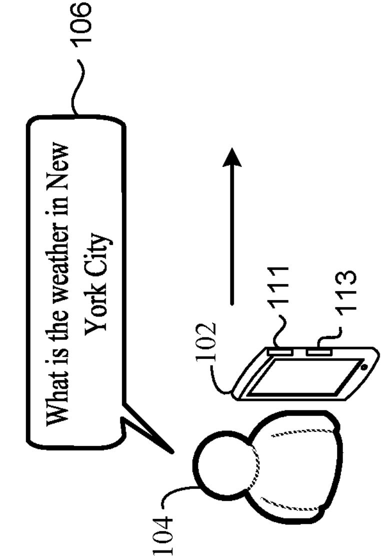

Automatic speech recognition (ASR) models have made significant advances in performance including accuracy (e.g., word error rate (WER)) and latency (e.g., delay between speech and text output) for high-resource languages. High-resource languages (e.g., the English language) are languages that have a vast amount of labeled training data readily available for training ASR models. Yet, the performance of ASR models is largely dependent upon the amount of training that the ASR models are trained on. As such, for low-resource or even medium resource languages (e.g., Lithuanian, Dutch, etc.), ASR models have not seen a similar level of performance advancement. To address the issue for low-resource languages, some training approaches aim to extend the performance from ASR models trained on high-resource languages to other lower-resource languages.

For instance, one training approach is to train or pre-train an ASR model on a high-resource language and then fine-tune the ASR model on a different language. However, a challenge of applying large-scale ASR models for mobile applications is limiting model complexity (e.g., trainable parameters) due to resource constraints of mobile devices. That is, ASR models that have a significant amount of parameters consume many computational and storage resources such that the ASR model is not suitable for many on-device applications. Moreover, fine-tuning ASR models on different languages requires a significant amount of time and resources which makes fine-tuning ASR models for these different low-resource languages even more burdensome.

To that end, implementations herein are directed towards methods and systems for parameter-efficient model reprogramming for cross-lingual speech recognition. More specifically, a training process obtains an ASR model that was previously trained to recognize speech in a first language and receives an adaptation training dataset that includes training utterances each paired with a corresponding transcription and in a second language. The training process also integrates the ASR model with an input reprogramming module and a latent reprogramming module and adapts the integrated ASR model to learn how to recognize speech in the second language by training the input reprogramming module and the latent reprogramming module on the adaptation training data set. Notably, parameters of the ASR model are frozen while the training process trains the input reprogramming module and the latent reprogramming module. Training the input reprogramming module and the latent reprogramming module includes, for each respective transcribed training utterance, augmenting the respecting training utterance with a first trainable noise, augmenting a projection output with a second trainable noise, generating a corresponding speech recognition result based on the respective augmented projection output, and determining a supervised loss based on the corresponding speech recognition result for the respective transcribed training utterance and the corresponding transcription. Finally, the training process trains the input reprogramming module and the latent reprogramming module based on the supervised loss.

Advantageously, the training process is a parameter-efficient because the training process trains the ASR model on a new task while keeping the previously learned parameters of the ASR model frozen. Thus, by only introducing a relatively small amount of new trainable parameters (e.g., via the input reprogramming module and the latent reprogramming module), the ASR model adapts to the target task while remaining suitable for on-device applications. Simply put, the training process adapts the ASR model previously trained on a source task (i.e., recognize speech in the first language) to learn how to perform a target task (i.e., recognize speech in the second language) without introducing a significant number of new parameters into the ASR model. As will become apparent, the adaptation training dataset may also include untranscribed training utterances such that the training process trains the input reprogramming module and the latent reprogramming module jointly on an unsupervised loss and the supervised loss.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart/speaker display, a smart appliance, an automotive infotainment system, or an Internet-of-Things (IoT) device, and is equipped with data processing hardware 111 and memory hardware 113.

The user device 102 includes an audio subsystem configured to receive an utterance spoken by the user 104 (e.g., the user device 102 may include one or more microphones for recording the spoken utterance 106) and convert the utterance 106 into a corresponding digital format associated with input acoustic frames (i.e., audio features) 110 capable of being processed by the ASR system 100. In the example shown, the user 104 speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription 120 into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
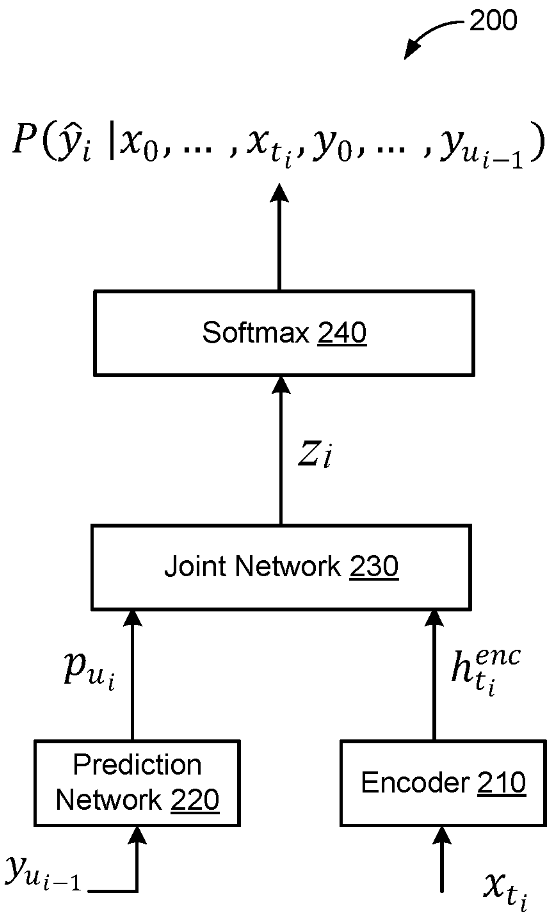
FIG. 2 is a schematic view of an example speech recognition model.

Referring to FIG. 2, an example ASR model 200 may include a Recurrent Neural Network-Transducer (RNN-T) model architecture which adheres to latency constraints associated with interactive applications. The use of the RNN-T model architecture is exemplary, and the ASR model 200 may include other architectures such as transformer-transducer, conformer-transducer, and conformer-encoder model architectures among others. The RNN-T model architecture provides a small computational footprint and utilizes less memory requirements than conventional ASR architectures, making the RNN-T model architecture suitable for performing speech recognition entirely on the user device

102 (e.g., no communication with a remote server is required). The RNN-T model architecture of the ASR model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder network 210 reads a sequence of d-dimensional feature vectors (e.g., acoustic frames 110 (FIG. 1)) $x=(x_1, x_2, \ldots, x_T)$, where $x_t \in \mathbb{R}^d$, and produces at each output step a higher-order feature representation. This higher-order feature representation is denoted as $$h_1^{enc}, \ldots, h_T^{enc}.$$

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network 220 may be replaced by an embedding look-up table to improve latency by outputting looked-up sparse embeddings in lieu of processing dense representations. The joint network 230 then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthgraphic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the ASR model 200 at the corresponding output step. In this manner, the RNN-T model architecture of the ASR model 200 does not make a conditional independence assumption, rather the prediction of each symbol is conditioned not only on the acoustics but also on the sequence of labels output so far. The ASR model 200 does assume an output symbol is independent of future acoustic frames 110, which allows the ASR model 200 to be employed in a streaming fashion.

In some examples, the encoder network 210 of the RNN-T model 200 includes a stack of self-attention layers/blocks, such as conformer blocks. Here, each conformer block includes a series of multi-headed self-attention, depth wise convolution and feed-forward layers. The encoder network 210 may include LSTM layers in lieu of self-attention layers/blocks.

The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The softmax layer 240 may be composed of a unified word piece or grapheme set that is generated using all unique word pieces or graphemes in a plurality of training data sets.

Figure 3A:
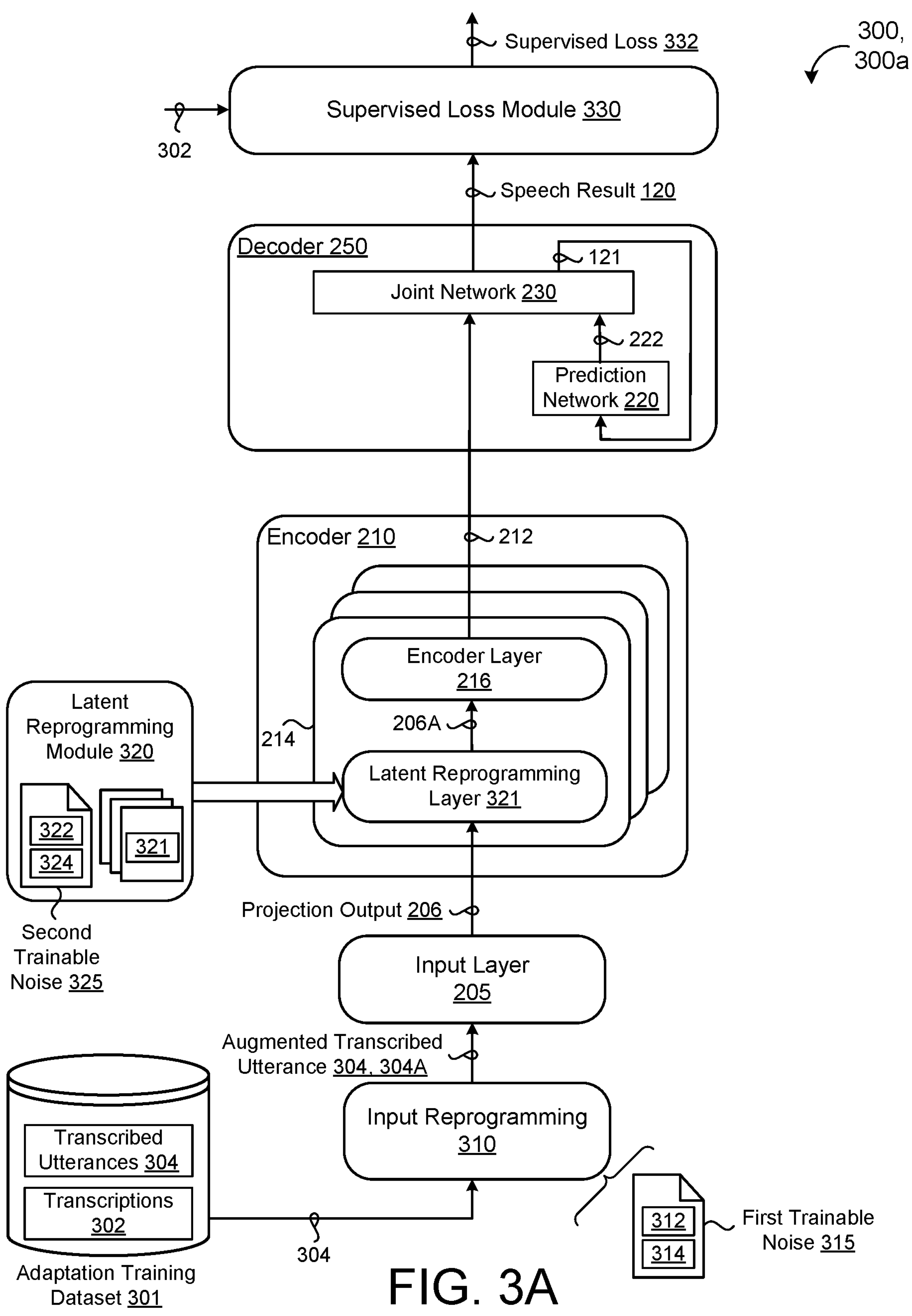
FIGS. 3A and 3B are schematic views of an example training process for the speech recognition model.
Figure 3B:
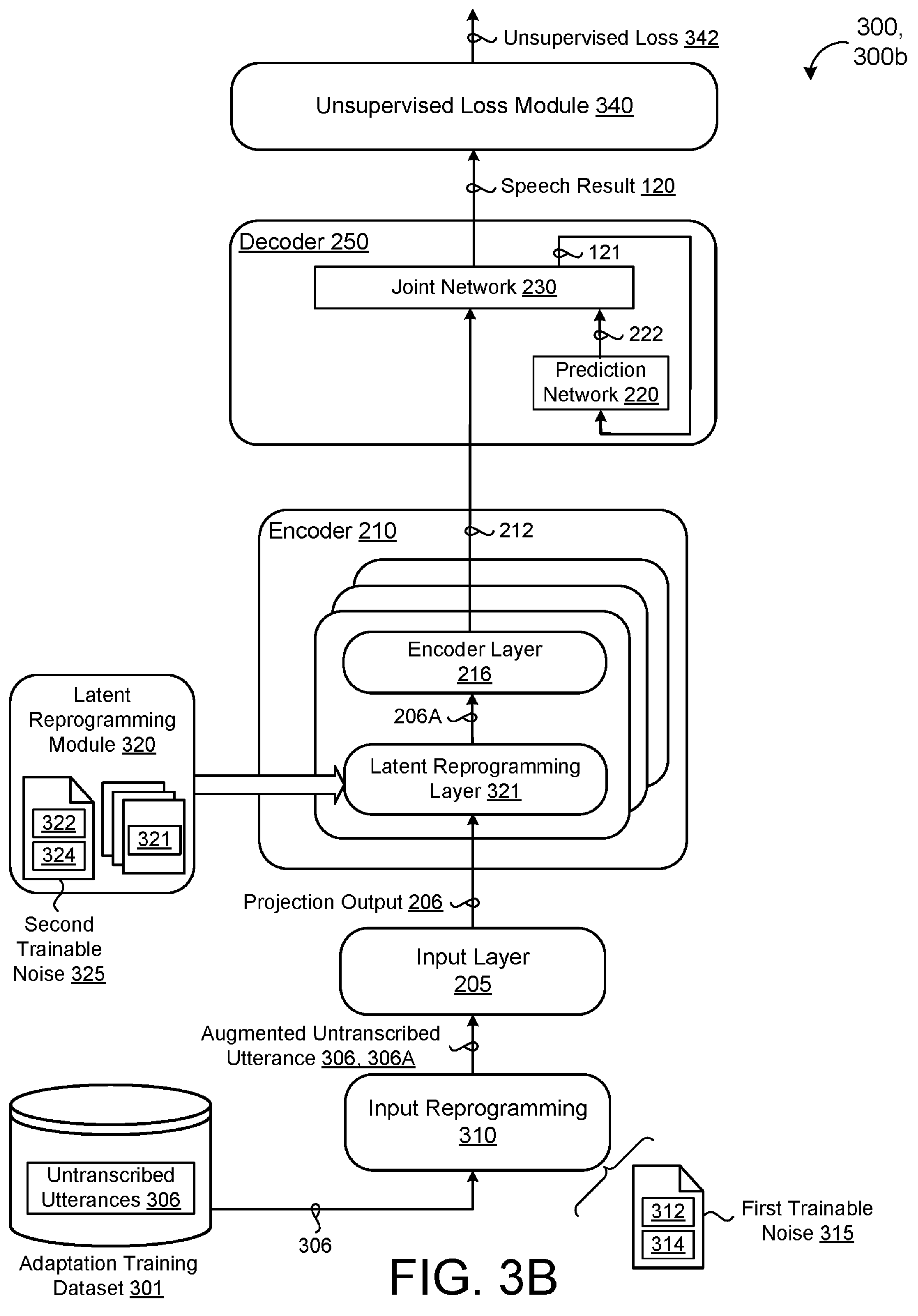

FIGS. 3A and 3B illustrate an example training process 300 for adapting the ASR model 200 (FIG. 2) that is previously trained to recognize speech in a first language to recognize speech in a second language. More specifically, the training process 300 includes a supervised loss part 300, 300*a* (FIG. 3A) and an unsupervised loss part 300, 300*b* (FIG. 3B). The training process 300 obtains the trained ASR model (M) 200 which was previously trained on an initial training dataset to recognize speech in the first language (i.e., source task) and adapt the trained ASR model 200 to learn to recognize speech in the second language (i.e., target task) different than the first language. That is, the training process 300 adapts the ASR model 200 to learn the target task (e.g., which the ASR model 200 has not yet been trained to perform) using an adaptation training dataset 301 that includes training utterances in a second language different than the first language the ASR model 200 trained on. For example, the ASR model 200 may have previously trained on an initial training dataset that includes English training utterances while the adaptation training dataset 301 includes French training utterances. The adaptation training dataset 301 includes one or more transcribed training utterances 304 (FIG. 3A) each including audio data paired with a corresponding transcription 302. The transcription 302 may include text in the first language and/or the second language. The adaptation training dataset 301 may also include one or more untranscribed training utterances 306 (FIG. 3B) each including audio-only data such that the untranscribed training utterances 306 are not paired with any corresponding transcriptions. As used herein, the one or more transcribed training utterances 304 and the one or more untranscribed training utterances 306 may be collectively referred to as "training utterances 304, 306."

Notably, the parameters (Θ) of the trained ASR model 200 remain frozen (i.e., are not updated) during the training process 300. As such, based on audio data of each training utterance 304, 306, the trained ASR model 200 predicts a speech recognition result 120 according to:

$$y' = M_\Theta(x) \qquad (1)$$

In Equation 1, x represents audio data of a respective training utterance 304, 306 and y represents the predicted speech recognition result 120. Advantageously, adapting the trained ASR model 200 to recognize speech in the second language while parameters of the ASR model 200 remain frozen enables the ASR model 200 to learn the target task without significantly increasing a size (e.g., number of parameters) of the trained ASR model 200. To that end, the training process 300 introduces extra trainable parameters into the ASR model 200 in order to adapt the ASR model 200 to learn to recognize speech in the second language by integrating the ASR model 200 with an input reprogramming module 310 and a latent reprogramming module 320. That is, because the parameters of the trained ASR model 200 are frozen, the training process introduces the trainable parameters thereby enabling the ASR model 200 to adapt to recognizing speech in the second language. Thus, the input reprogramming module 310 and the latent reprogramming module 320 each include respective trainable parameters that are updated during the training process 300. Simply put, only parameters of the input reprogramming module 310 and the latent reprogramming module 320 are updated during the training process 300 while parameters of the ASR model 200 learned from training on the initial training dataset remain frozen.

The input reprogramming module 310 is configured to augment each training utterance 304, 306 in the adaptation training dataset 301 with a first trainable noise 315 thereby generating a corresponding augmented training utterance (e.g., augmented transcribed training utterance 304, 304A or augmented untranscribed training utterance 306, 306A). By augmenting each respective training utterance 304, 306 with the first trainable noise 315, the input reprogramming module 310 minimizes a distance (i.e., acoustic similarity) between a distribution of the initial training dataset used to train the ASR model 200 and a distribution of the adaptation training dataset 301. Simply put, augmenting the training utterances 304, 306 from the adaptation training dataset 301 makes the training utterances 304, 306 sound like the utterances from the initial training dataset. In particular, augmenting each respective training utterance 304, 306 includes transforming audio data corresponding to the respective training utterance 304, 306 to sound like speech in the first language that the ASR model 200 was previously trained on. In some instances, the input reprogramming module 310 transforms the audio data of the respective training utterance 304, 306 to sound like speech in the first language that has a similar or same linguistic meaning.

For example, the training process 300 may obtain a respective ASR model 200 previously trained to recognize English speech and, thereafter, receive a respective training utterance 304, 306 of "ne" in the Lithuanian language such that the input reprogramming module 310 augments the respective training utterance 304, 306 to sound acoustically similar to a corresponding English term of "no" that has the same linguistic meaning as "ne" in Lithuanian. Thus, because the ASR model 200 was previously trained to recognize speech spoken in English, the ASR model 200 may adapt to accurately recognize the respective training utterance 304, 306 of "ne" because the input reprogramming module 310 transforms the audio to sound like "no" in English even though parameters of the ASR model 200 remain frozen. Stated differently, instead of fine-tuning the ASR model 200 to recognize Lithuanian speech, the training process 300 transforms training utterances 304, 306 spoken in Lithuanian to sound like a corresponding utterance spoken in English such that the ASR model 200, which is already trained to recognize English speech, learns to recognize Lithuanian speech.

In some implementations, the input reprogramming module 310 augments each respective training utterance 304, 306 with the first trainable noise 315 by extracting acoustic feature-dependent noise 312 from the respective training utterance 304, 306 and generating acoustic feature-independent noise 314. In these implementations, the input reprogramming module 310 determines the first trainable noise 315 for each respective training utterance 304, 306 based on the acoustic feature-dependent noise 312 extracted from the respective training utterance 304, 306 and the acoustic feature-independent noise 314. The feature-independent noise (w 92) 314 includes a universal noise that is deployed for cross-lingual adaptation. That is, the acoustic feature-independent noise 314 may be the same for each training utterance 304, 306 in the adaptation training dataset 301. In some instances, the input reprogramming module 310 may generate a respective acoustic feature-independent noise 314 for each language the ASR model 200 is adapting to learn. For instance, the input reprogramming module 310 may generate a first acoustic feature-independent noise 314 when adapting the ASR model 200 to learn speech in Lithuanian and generate a second acoustic feature-independent noise 314 when adapting the ASR model 200 to learn speech in French.

On the other hand, the acoustic feature-dependent noise ($H_{\theta_1}(x)$) 312 is dependent upon the acoustic data of each training utterance 304, 306. That is, the input reprogramming module 310 extracts corresponding acoustic feature-dependent noise 312 from each respective training utterance 304, 306 such that the extracted acoustic feature-dependent noise 312 is tailored to the acoustic data of the respective training utterance 304, 306. For example, the input reprogramming module 310 extracts a first acoustic feature-dependent noise 312 from a first training utterance 304, 306 of "taip" and a extracts a second feature-dependent noise 312 from a second training utterance 304, 306 of "ne" because the first and second training utterances are acoustically and linguistically different. Thus, for each respective training utterance 304, 306, the input reprogramming module 310 determines the first trainable noise 315 based on the corresponding acoustic feature-dependent noise 312 extracted from the respective training utterance 304, 306 and the acoustic feature-independent noise 314 and augments the respective training utterance 304, 306 based on the determined first trainable noise 315.

In some examples, the trained ASR model 200 includes an input layer 205 that is configured to receive, as input, each respective augmented training utterance 304A, 306A generated by the input reprogramming module 310 and generate a corresponding projection output 206 based on the respective augmented training utterance 304A, 306A. Here, the input layer 205 may include an input projection layer. The encoder 210 receives, as input, each respective projection output 206 generated by the input layer 205 for each training utterance 304, 306 and generates a higher order feature representation 212 based on the respective projection output 206. The encoder 210 includes one or more encoder blocks 214 each having a respective encoder layer 216. Thus, the respective encoder layer 216 of each encoder block 214 generates an intermediate encoding that is output to a subsequent encoder block 214 whereby the respective encoder layer 216 of a last encoder block 214 of the one or more encoder blocks 214 generates the higher order feature representation 212.

The latent reprogramming module 320 introduces additional trainable parameters in the latent space for adapting the ASR model 200 to learn the target task (i.e., recognizing speech in the second language). That is, the latent reprogramming module 320 may include a stack of latent reprogramming layers 321. In some instances, a number of encoder blocks 214 (and also a number of encoder layers 216) corresponds to a number of latent reprogramming layers 321. Thus, the training process 300 integrates the ASR model 200 with the latent reprogramming module 320 by inserting a respective latent reprogramming layer 321 from the stack of latent reprogramming layers 321 before the respective encoder layer 216 of each encoder block 214. In the example shown, the ASR model 200 has three (3) encoder blocks 214 each having a respective encoder layer 216, and the training process 300 inserts a respective latent reprogramming layer 321 before each respective encoder layer 316. Yet, the encoder 210 may include any number of encoder blocks 214 and the latent reprogramming module 320 may include any number of latent reprogramming layers 321.

The latent reprogramming module 320 is configured to augment each projection output 206 generated by the input layer 205 with a second trainable noise 325. More specifically, augmenting the projection output 206 with the second trainable noise includes extracting latent feature-dependent noise 322 from the projection output and generating latent feature-independent noise 324. Thereafter, for each respective training utterance 304, 306, the latent reprogramming module 320 determines the second trainable noise 325 based on the corresponding latent feature-dependent noise 322 extracted from the respective training utterance 304, 306 and the latent feature-independent noise 324 and augments the respective training utterance 304, 306 based on the determined second trainable noise 325. The latent reprogramming module 320 generates the latent feature-independent noise 324 independent of the received projection output 206. On the other hand, the latent feature-dependent noise 322 is dependent upon the projection output 206 generated from each training utterance 304, 306. That is, the latent reprogramming module 320 extracts corresponding latent feature-dependent noise 322 from each respective training utterance 304, 306 such that the extracted latent feature-dependent noise 322 is tailored to the embedding of the respective training utterance 304, 306. In some examples, each latent reprogramming layer 321 applies the second trainable noise 325.

In some implementations, an initial latent reprogramming layer 321 receives each projection output 206 generated by the input layer 205 and augments the projected output 206 to generate an intermediate augmented projected output 206, 206A. Thereafter, an initial encoder layer 216 receives the intermediate augmented projected output 206A output by the initial latent reprogramming layer 321 and generates the intermediate encoding based on the intermediate augmented projected output 206A. As described above, the initial encoder layer 216 outputs the intermediate encoding to a subsequent encoder block 214 of the encoder 210 whereby a subsequent latent reprogramming layer 321 outputs another intermediate augmented projected output 206A to a subsequent encoder layer 216 that generates another intermediate encoding. Finally, a final latent reprogramming layer 321 in the stack of latent reprogramming layers 321 receives the intermediate encoding from an immediately preceding encoder block 214 and generates a final augmented projection output 206A and a final encoder layer 216 generates the higher order feature representation 212 based on the intermediate encoding received from the immediately preceding encoder block 214.

Figure 4:
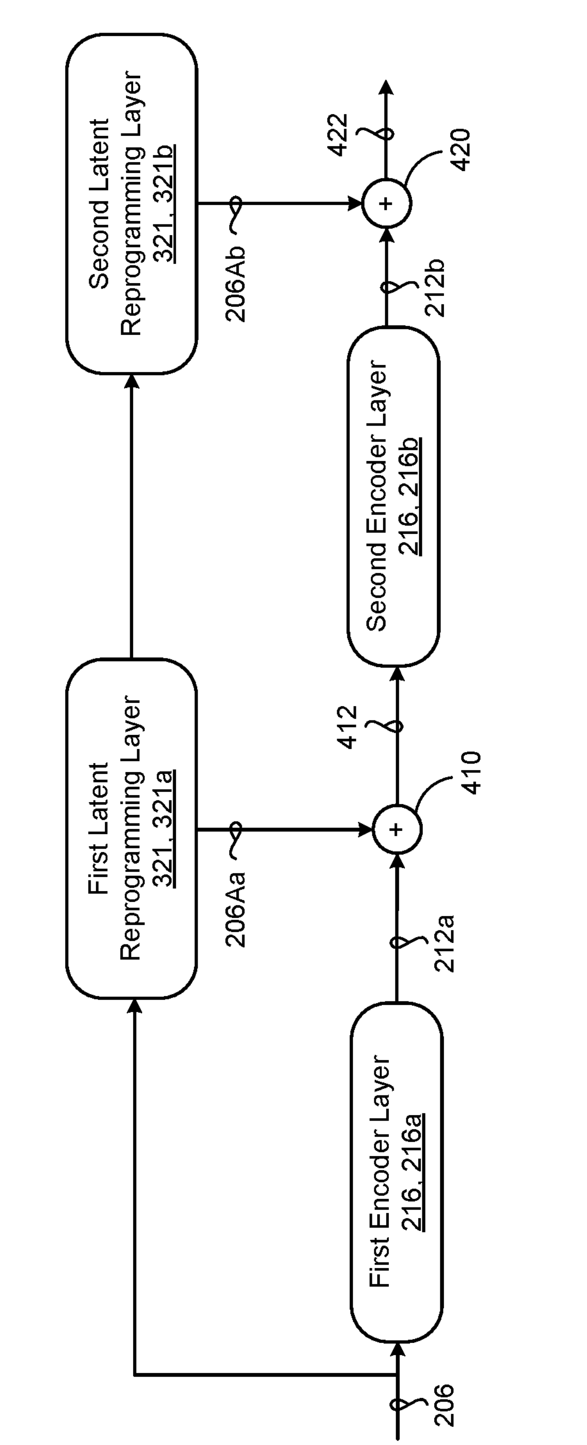
FIG. 4 is a schematic view of an example bridged connection configuration.

In other implementations, the latent reprogramming module 320 includes a bridge connection between adjacent reprogramming layers 321. That is, instead of the reprogramming layers 321 receiving an input from a preceding encoder layer 216, in the bridge connection configuration each reprogramming layer 321 includes a respective bridged connection with a respective subsequent reprogramming layer 321 in the stack of reprogramming layers 321. For example, FIG. 4 shows an example bridge connection configuration 400. In particular, the example bridge connection configuration 400 includes a first encoder layer 216, **216*a*, a second encoder layer 216, 216*b*, a first latent reprogramming layer 321, 321*a*, and a second latent reprogramming layer 321, 321*b*. In this example, the first encoder layer 216*a* and the first latent reprogramming layer 322*a* correspond to initial layers that receive, as input, the projection output 206 and generate, as output, a first intermediate encoding 212*a* and a first intermediate augmented projection output 206Aa, respectively. Thereafter, a first concatenator 410 concatenates the first intermediate encoding 212*a* and the first intermediate augmented projection output 206Aa whereby the second encoder layer 216*b* receives the concatenation 412 and generates a second intermediate encoding 212*b* based on the concatenation 412. Continuing with the example, the second latent reprogramming layer 322*b* receives the first intermediate augmented projection output 206Aa and generates a second intermediate augmented projection output 206Ab based on the first intermediate augmented projection output 206Aa. Notably, the connection between the first latent reprogramming layer 322*a* and the second latent reprogramming layer 322*b* is the bridged connection. Finally, a second concatenator 420 concatenates the second intermediate encoding 212*b* and the second intermediate augmented projection output 206Ab. If the second encoder layer 216*b* and the second latent reprogramming layers 322*b* correspond to final layers, the concatenation 422 is output as the higher order feature representation 212, otherwise the concatenation 422 is output to the next encoder layer 216**.

Referring back to FIGS. 3A and 3B, a decoder 250 of the ASR model 200 is configured to receive, as input, each respective higher order feature representation 212 generated by the encoder 210 and generate a corresponding speech recognition result 120 based on the respective higher order feature representation 212. In particular, the decoder 250 includes the prediction network 220 and the joint network 230. Thus, the joint network 230 of the decoder 250 receives a dense representation 222 generated by the prediction network 220 and the higher order feature representation 212 generated by the encoder 210 and generates the speech recognition result 120 using a set of multilingual graphemes. In other examples, a set of multilingual words, wordpiece, and/or phonemes may be used in addition to, or in lieu of, the multilingual graphemes. In some examples, the speech recognition result 120 includes a probability distribution over possible speech recognition hypotheses based on the higher order feature representation 212 and the dense representation 222. As used herein, "possible speech recognition hypotheses" correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. The set of values can be a vector (e.g., a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The probability distribution output by the joint network 230 can include a posterior probability value for each of the different output labels. Thus, if there are 100 different output labels representing different graphemes or other symbols, the output of the joint network 230 can include 100 different probability values, one for each output label. The probability distribution can then be used to select and assign scores to candidate orthographic elements (e.g., graphemes, wordpieces, and/or words) in a beam search process by the Softmax layer 240 (FIG. 2). For example, the Softmax layer 240 may identify a respective one of the speech recognition hypotheses having a corresponding highest probability from the probability distribution and generate the speech recognition result 120 of the respective training utterance 304, 306 based on the identified respective one of the possible speech recognition hypotheses having the corresponding highest probability.

In some examples, the prediction network 220 receives, as input, a sequence of non-blank symbols 121 output by the joint network 230 and generates the dense representation 222. The sequence of non-blank symbols 121 corresponds to the speech recognition result 120 output by the joint network 230 with any spaces or blank symbols removed. Thus, the joint network 230 generates the speech recognition result 120 for the training utterance 304, 306 based on the higher order feature representation 212 and the dense representation 232 representing word-piece tokens previously seen. In some examples, the Softmax layer 240 (FIG. 2) is integrated with the decoder 250 (not shown) such that the output from the decoder 250 represents the output of the Softmax layer 240.

Referring now specifically to FIG. 3A, the supervised loss part 300*a* employs a supervised loss module 330 configured to receive, as input, the speech recognition result 120 generated by the decoder 250 for each transcribed training utterance 304 and the corresponding transcriptions 302 and determine a supervised loss 332 based on the speech recognition result 120 and the corresponding transcription 302. That is, the supervised loss module 330 compares the speech recognition result 120 for each respective transcribed training utterance 304 to the corresponding transcription 302 of the transcribed training utterance 304 to determine the supervised loss 332. The supervised loss module 330 determines supervised losses 332 for each transcribed training utterance 304 in the adaptation training dataset 301. Described in greater detail below, the supervised loss part 300*a* may train the input reprogramming module 310 and the latent reprogramming module 320 based on the supervised loss 332.

Referring now specifically to FIG. 3B, the unsupervised loss part 300*b* employs a unsupervised loss module 340 configured to receive, as input, the speech recognition result 120 generated by the decoder 250 for each untranscribed training utterance 306 and determine an unsupervised loss 342. However, the untranscribed training utterances 306 are not paired with any transcriptions to determine the unsupervised loss 342. To that end, the unsupervised loss part 300*b* may employ a masked language modeling (MLM) that masks a subset of frames from each higher order feature representation 212 generated by the encoder 210 by setting the subset of frames equal to zero. Thereafter, the decoder 250 may generate a speech recognition result 120 for a higher order feature representation 212 where no masking was applied and another higher order feature representation 212 where masking was applied by the MLM module. Here, both higher order feature representations 212 correspond to a same respective untranscribed training utterance 306 whereby the higher order feature representation 212 generated for the higher order feature representation 212 where no masking was applied serves as a ground-truth transcription. As such, the supervised loss module 330 may compare both speech recognition results 120 corresponding to the same respective untranscribed training utterance 306. Thus, the unsupervised loss module 340 may compare the speech recognition result 120 generated for the higher order feature representation 212 where no masking was applied with the speech recognition result generated for the higher order feature representation where masking was applied to determine the unsupervised loss 342. Described in greater detail below, the unsupervised loss part 300*b* may train the input reprogramming module 310 and the latent reprogramming module 320 based on the unsupervised loss 342.

Referring again to FIGS. 3A and 3B, in some implementations, the training process 300 trains the input reprogramming module 310 and the latent reprogramming module 320 using only the supervised losses 332 or only the unsupervised losses 342. In other implementations, the training process 300 jointly trains the input reprogramming module 310 and the latent reprogramming module 320 using both the supervised losses 332 and the unsupervised losses 342. More specifically, training the input reprogramming module 310 based on the supervised losses 332 and the unsupervised losses 342 aims to determine a trainable reprogramming function ($\mathcal{R}_\theta$) to minimize training losses ($\mathcal{L}_{error}$) including the supervised losses 332 and the unsupervised losses 342. Thus, the training process 300 may train the input reprogramming module 310 according to:

$$\theta^* = \arg \min_\theta \{\mathcal{L}_{error}(M_\Theta(R_\theta(x))), \hat{y}\} \tag{2}$$

$$\mathcal{R}_\theta(x) = x + w_{\theta_2} + \mathcal{H}_{\theta_1}(x) \tag{3}$$

In Equation 3, x represents training utterances 304, 306, $w_{\theta_2}$ represents the acoustic feature-independent noise 314, and $\mathcal{H}_{\theta_1}(x)$ represents the acoustic feature-dependent noise 312. Thus, by training the input reprogramming module 310, the training process 300 teaches the input reprogramming module 310 to augment utterances (e.g., via augmenting with the first trainable noise 315) in the second language to sound acoustically similar to linguistically similar utterances in the first language that the ASR model 200 is trained on. The training process 300 trains the input programming module 310 to generate the acoustic feature-independent noise 312 and determine the acoustic feature-dependent noise 314 such that the first trainable noise 315 augments the utterances in the second language to sound like utterances in the first language.

On the other hand, training the latent reprogramming module 31=20 based on the supervised losses 332 and the unsupervised losses 342 aims to determine another trainable reprogramming function ($\mathcal{R}_\theta$) to minimize the supervised losses 332 and the unsupervised losses 342. Latent reprogramming without a bridged connection (e.g., as shown in FIGS. 3A and 3B) may be represented by:

$$\mathcal{F}_{\Theta}^{i+1}(\mathcal{R}_{\theta}(h^{i})) \tag{4}$$

Latent reprogramming with the bridged connection (e.g., as shown in FIG. 4) may be represented by:

$$\mathcal{F}_{\Theta}^{i+1}(\mathcal{R}_{\theta}(h^{i} + \hat{\beta}h^{i-1})) \tag{5}$$

In Equation 5, $\hat{\beta}$ represents a deterministic dropout parameter. In Equations 4 and 5, i represents a respective encoder block 214 from the one or more encoder blocks 214. Thus, by training the latent reprogramming module 320, the training process 300 teaches the latent reprogramming module 320 to augment latent representations in the latent space (e.g., via augmenting with the second trainable noise 325) to have similar embeddings that the ASR model 200 is trained to generate for a linguistically similar utterance in the first language. For example, whether the ASR model 200 directly receives the utterance of "no" spoken in English or receives the utterance of "ne" spoken in Lithuanian, the training process 300 adapts the encoder 210 to generate similar higher order feature representations 212.

In short, by adapting the ASR model 200 that was previously trained on speech in the first language to recognize speech in the second language while parameters of the ASR model 200 are frozen, the ASR model 200 may be deployed on mobile applications to recognize speech in the first and/or second language because of the parameter efficient adaptation process. Specifically, the training process 300 trains the input reprogramming module 310 to transform audio data to sound acoustically similar to linguistically similar utterances in the first language that the ASR model 200 is trained to recognize and trains the latent reprogramming module 320 to augment latent representations to be similar to embeddings generated for similar linguistically similar utterances in the first language. Introducing these relatively small amount of training parameters during the training process 300 enables the ASR model 200 to have similar performance to a high-resource language without significantly increasing the amount of parameters of the ASR model 200.

Figure 5:
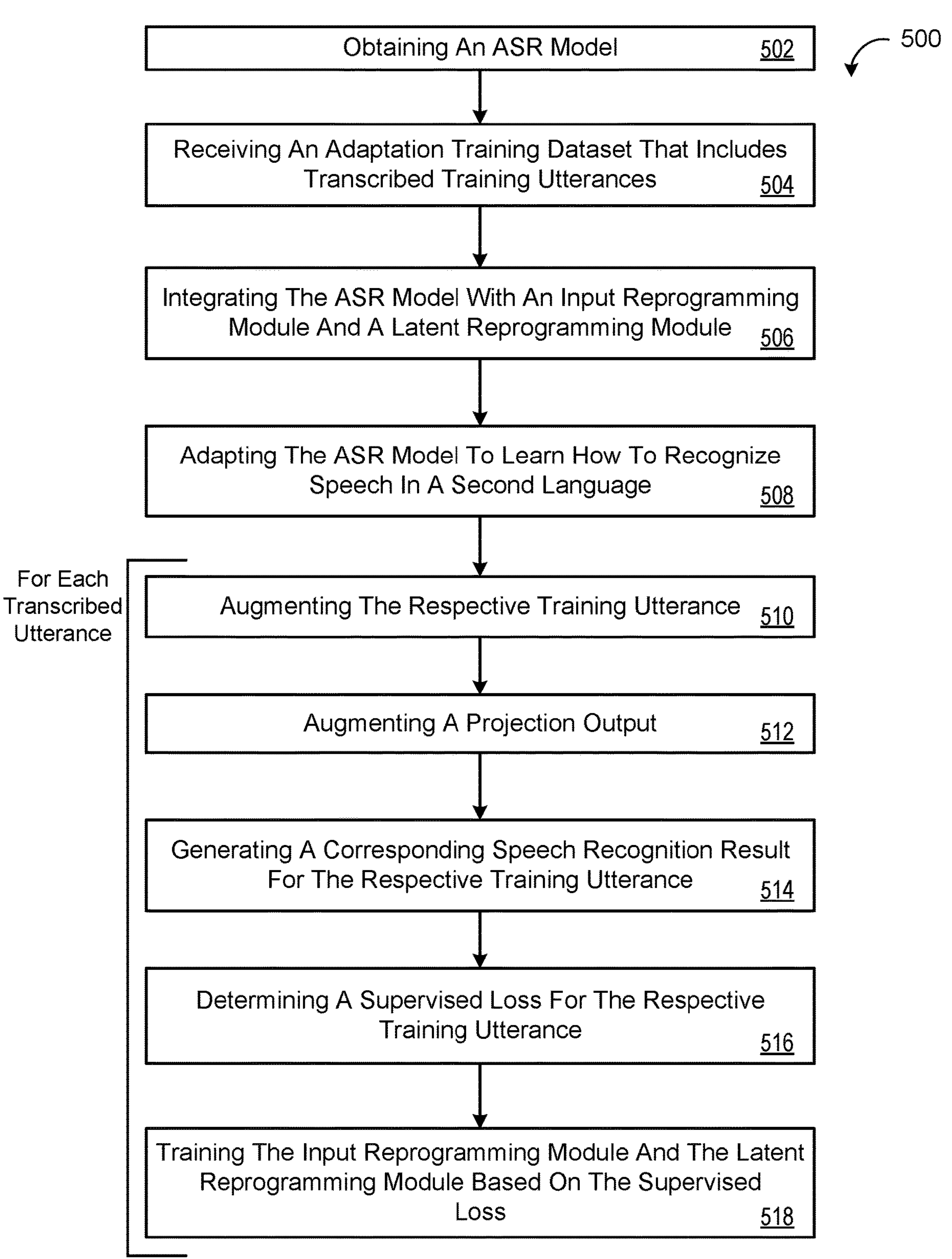
FIG. 5 is a flowchart of an example arrangement of operations for a method of parameter-efficient model reprogramming for cross-lingual speech recognition.
Figure 6:
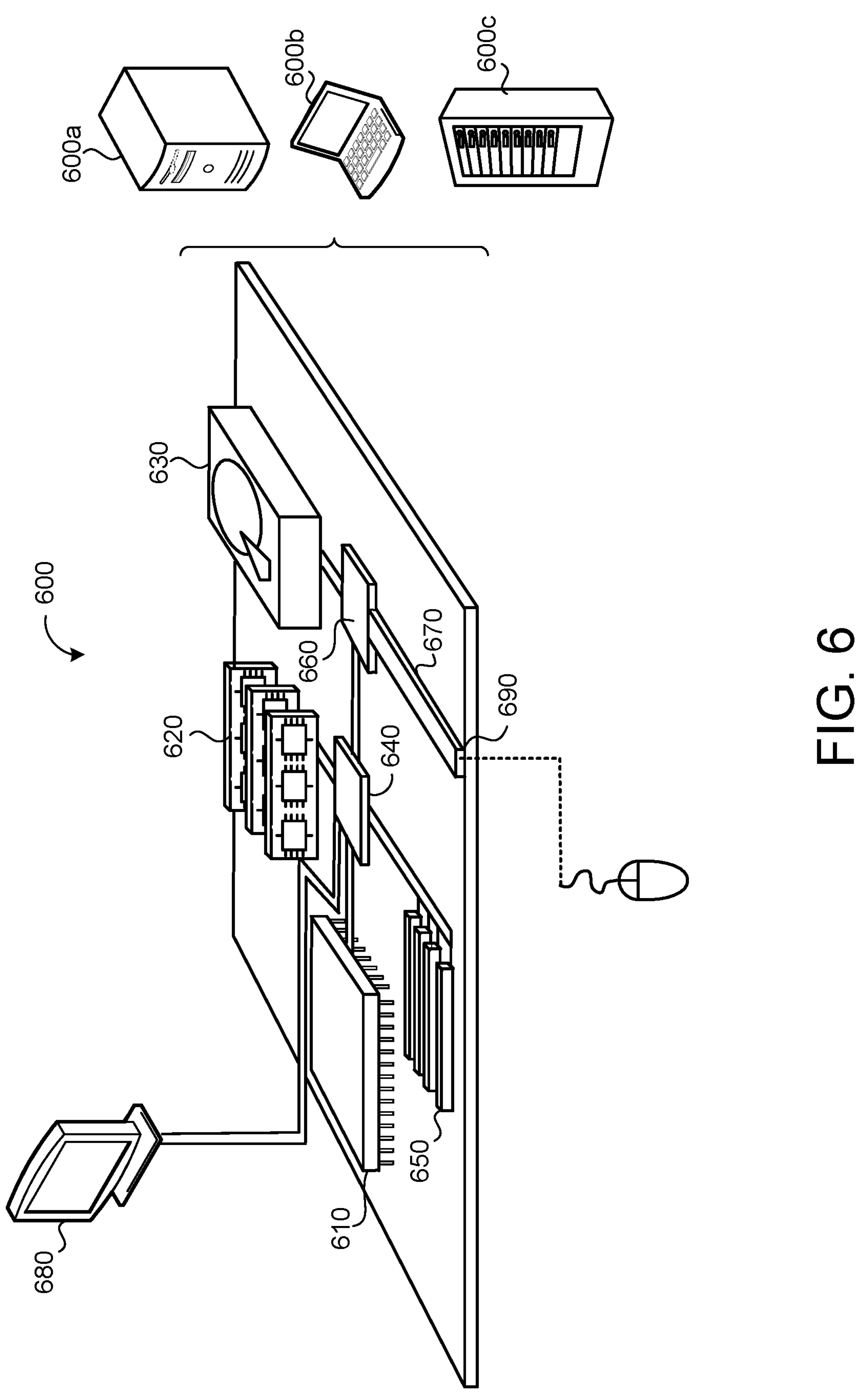
FIG. 6 is a schematic view of an example computing device that may be used to implement the systems and methods described herein.

FIG. 5 is a flowchart of an example arrangement of operations for a computer-implemented method 500 of parameter-efficient model reprogramming for cross-lingual speech recognition. The method 500 may execute on data processing hardware 610 (FIG. 6) using instructions stored on memory hardware 620 (FIG. 6). The data processing hardware 610 and the memory hardware 620 may reside on the user device 102 and/or the remote computing device 201 each corresponding to a computing device 600 (FIG. 6).

At operation 502, the method 500 includes obtaining an ASR model 200 that is trained on an initial training dataset to recognize speech in a first language. At operation 504, the method 500 includes receiving an adaptation training dataset 301 that includes one or more transcribed training utterances 304 in a second language different than the first language. Each respective transcribed training utterance 304 in the adaptation training dataset 301 paired with a corresponding transcription 302. At operation 506, the method 500 includes integrating the ASR model 200 with an input reprogramming module 310 and a latent reprogramming module 320. At operation 508, the method 500 includes adapting the ASR model 200 integrated with the input reprogramming module 310 and the latent reprogramming module 320 to learn how to recognize speech in the second language by training the input reprogramming module 310 and the latent reprogramming module 320 on the adaptation training dataset 301 while parameters of the ASR model 200 are frozen.

The method 500 trains the input reprogramming module 310 and the latent reprogramming module 320 by performing operations 510-518 for each respective transcribed training utterance 304. At operation 510, the method 500 includes augmenting the respective transcribed training utterance 304 with a first trainable noise 315 using the input reprogramming module 310. At operation 512, the method includes augmenting a projection output 206 with a second trainable noise 325 using the latent reprogramming module 320. The projection output 206 corresponds to the respective augmented transcribed training utterance 206A. At operation 514, the method 500 includes generating a corresponding speech recognition result 120 for the respective training utterance 304 based on the augmented projection output 206A using ASR model 200 integrated with the input reprogramming module 310 and the latent reprogramming module 320. At operation 516, the method 500 includes determining a supervised loss 332 based on the corresponding speech recognition result 120 for the respective training utterance 304 and the corresponding transcription 302. At operation 518, the method 500 includes training the input reprogramming module 310 and the latent reprogramming module 320 based on the supervised loss 332.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer- readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:

obtaining an automatic speech recognition model (ASR) model, the ASR model trained on an initial training dataset to recognize speech in a first language;

receiving an adaptation training dataset comprising one or more transcribed training utterances in a second language different than the first language, each respective transcribed training utterance in the adaptation training dataset paired with a corresponding transcription;

integrating an encoder of the ASR model with an input reprogramming module and a latent reprogramming module, wherein the input reprogramming module is configured to augment each training utterance in the adaptation training dataset with a first trainable noise, and the latent reprogramming module is configured to augment a projection output with a second trainable noise; and adapting the ASR model integrated with the input reprogramming module and the latent reprogramming module to learn how to recognize speech in the second language by training the input reprogramming module and the latent reprogramming module on the adaptation training dataset while parameters of the ASR model are frozen.

2. The computer-implemented method of claim 1, wherein training the input reprogramming module and the latent reprogramming module on the adaptation training dataset comprises, for each respective training utterance:

augmenting, using the input reprogramming module, the respective transcribed training utterance with the first trainable noise;

augmenting, using the latent reprogramming module, the projection output with the second trainable noise, the projection output corresponding to the respective augmented transcribed training utterance;

generating, using the ASR model integrated with the input reprogramming module and the latent reprogramming module, a corresponding speech recognition result for the respective transcribed training utterance based on the augmented projection output;

determining a supervised loss based on the corresponding speech recognition result for the respective transcribed training utterance and the corresponding transcription; and training the input reprogramming module and the latent reprogramming module based on the supervised loss.

3. The computer-implemented method of claim 2, wherein the adaptation training dataset further comprises additional transcribed training utterances in a plurality of other languages, each other languages of the plurality of other languages different than the first language.

4. The computer-implemented method of claim 2, wherein augmenting the respective transcribed training utterance with the first trainable noise comprises:

extracting acoustic feature-dependent noise from the respective transcribed training utterance;

generating acoustic feature-independent noise; and determining the first trainable noise based on the acoustic feature-dependent noise and the acoustic feature-independent noise.

5. The computer-implemented method of claim 2, wherein augmenting the respective transcribed training utterance with the first trainable noise minimizes a distance between a distribution of the initial training dataset and a distribution of the adaptation training dataset.

6. The computer-implemented method of claim 2, wherein augmenting the projection output with the second trainable noise comprises:

extracting latent feature-dependent noise from the projection output;

generating latent feature-independent noise; and determining the second trainable noise using the latent feature-dependent noise and the latent feature-independent noise.

7. The computer-implemented method of claim 2, wherein the ASR model integrated with the input reprogramming module and the latent reprogramming module comprises:

an encoder comprising:

an input layer configured to:

receive the respective transcribed augmented training utterance from the input reprogramming module; and generate a corresponding projection output; and one or more encoder blocks configured to:

receive the corresponding projection output generated by the input layer; and generate a corresponding higher order feature representation;

a prediction network configured to:

receive a sequence of non-blank symbols output by a final Softmax layer; and generate a dense representation; and a joint network configured to:

receive the higher order feature representation generated by the encoder and the dense representation generated by the prediction network; and generate the corresponding speech recognition result for the respective augmented transcribed training utterance using a set of pre-trained multilingual graphemes.

8. The computer-implemented method of claim 1, wherein:

the ASR model comprises an encoder comprising one or more encoder blocks each including a respective encoder layer; and the latent reprogramming module comprises a stack of reprogramming layers, each respective reprogramming layer in the stack of reprogramming layers comprising a corresponding bridged connection with a respective subsequent reprogramming layer in the stack of reprogramming layers.

9. The computer-implemented method of claim 8, wherein integrating the ASR model with the input reprogramming module and the latent reprogramming module comprises inserting the stack of reprogramming layers into the encoder, each respective reprogramming layer in the stack of reprogramming layers disposed between each encoder block of the one or more encoder blocks.

10. The computer-implemented method of claim 1, wherein the adaptation training dataset further comprises one or more untranscribed training utterances in the second language, each respective untranscribed utterance in the adaptation training dataset not paired with any corresponding transcription.

11. The computer-implemented method of claim 10, wherein the operations further comprise:

determining an unsupervised loss using the one or more untranscribed training utterances; and training the input reprogramming module and the latent reprogramming module jointly on the unsupervised loss and the supervised loss.

12. A system comprising:

data processing hardware; and memory hardware in communication with the data processing hardware, the memory hardware storing instructions that when executed on the data processing hardware cause the data processing hardware to perform operations comprising:

obtaining an automatic speech recognition model (ASR) model, the ASR model trained on an initial training dataset to recognize speech in a first language;

receiving an adaptation training dataset comprising one or more transcribed training utterances in a second language different than the first language, each respective transcribed training utterance in the adaptation training dataset paired with a corresponding transcription;

integrating an encoder of the ASR model with an input reprogramming module and a latent reprogramming module, wherein the input reprogramming module is configured to augment each training utterance in the adaptation training dataset with a first trainable noise, and the latent reprogramming module is configured to augment a projection output with a second trainable noise; and adapting the ASR model integrated with the input reprogramming module and the latent reprogramming module to learn how to recognize speech in the second language by training the input reprogramming module and the latent reprogramming module on the adaptation training dataset while parameters of the ASR model are frozen.

13. The system of claim 12, wherein training the input reprogramming module and the latent reprogramming module on the adaptation training dataset comprises, for each respective training utterance:

augmenting, using the input reprogramming module, the respective transcribed training utterance with the first trainable noise;

augmenting, using the latent reprogramming module, the projection output with the second trainable noise, the projection output corresponding to the respective augmented transcribed training utterance;

generating, using the ASR model integrated with the input reprogramming module and the latent reprogramming module, a corresponding speech recognition result for the respective transcribed training utterance based on the augmented projection output;

determining a supervised loss based on the corresponding speech recognition result for the respective transcribed training utterance and the corresponding transcription; and training the input reprogramming module and the latent reprogramming module based on the supervised loss.

14. The system of claim 13, wherein the adaptation training dataset further comprises additional transcribed training utterances in a plurality of other languages, each other languages of the plurality of other languages different than the first language.

15. The system of claim 13, wherein augmenting the respective transcribed training utterance with the first trainable noise comprises:

extracting acoustic feature-dependent noise from the respective transcribed training utterance;

generating acoustic feature-independent noise; and determining the first trainable noise based on the acoustic feature-dependent noise and the acoustic feature-independent noise.

16. The system of claim 13, wherein augmenting the respective transcribed training utterance with the first trainable noise minimizes a distance between a distribution of the initial training dataset and a distribution of the adaptation training dataset.

17. The system of claim 13, wherein augmenting the projection output with the second trainable noise comprises:

extracting latent feature-dependent noise from the projection output;

generating latent feature-independent noise; and determining the second trainable noise using the latent feature-dependent noise and the latent feature-independent noise.

18. The system of claim 13, wherein the ASR model integrated with the input reprogramming module and the latent reprogramming module comprises:

an encoder comprising:

an input layer configured to:

receive the respective transcribed augmented training utterance from the input reprogramming module; and generate a corresponding projection output; and one or more encoder blocks configured to:

receive the corresponding projection output generated by the input layer; and generate a corresponding higher order feature representation;

a prediction network configured to:

receive a sequence of non-blank symbols output by a final Softmax layer; and generate a dense representation; and a joint network configured to:

receive the higher order feature representation generated by the encoder and the dense representation generated by the prediction network; and generate the corresponding speech recognition result for the respective augmented transcribed training utterance using a set of pre-trained multilingual graphemes.

19. The system of claim 12, wherein:

the ASR model comprises an encoder comprising one or more encoder blocks each including a respective encoder layer; and the latent reprogramming module comprises a stack of reprogramming layers, each respective reprogramming layer in the stack of reprogramming layers comprising a corresponding bridged connection with a respective subsequent reprogramming layer in the stack of reprogramming layers.

20. The system of claim 19, wherein integrating the ASR model with the input reprogramming module and the latent reprogramming module comprises inserting the stack of reprogramming layers into the encoder, each respective reprogramming layer in the stack of reprogramming layers disposed between each encoder block of the one or more encoder blocks.

21. The system of claim 12, wherein the adaptation training dataset further comprises one or more untranscribed training utterances in the second language, each respective untranscribed utterance in the adaptation training dataset not paired with any corresponding transcription.

22. The system of claim 21, wherein the operations further comprise:

determining an unsupervised loss using the one or more untranscribed training utterances; and training the input reprogramming module and the latent reprogramming module jointly on the unsupervised loss and the supervised loss.

* * * * *